UNITED STATES PATENT OFFICE.

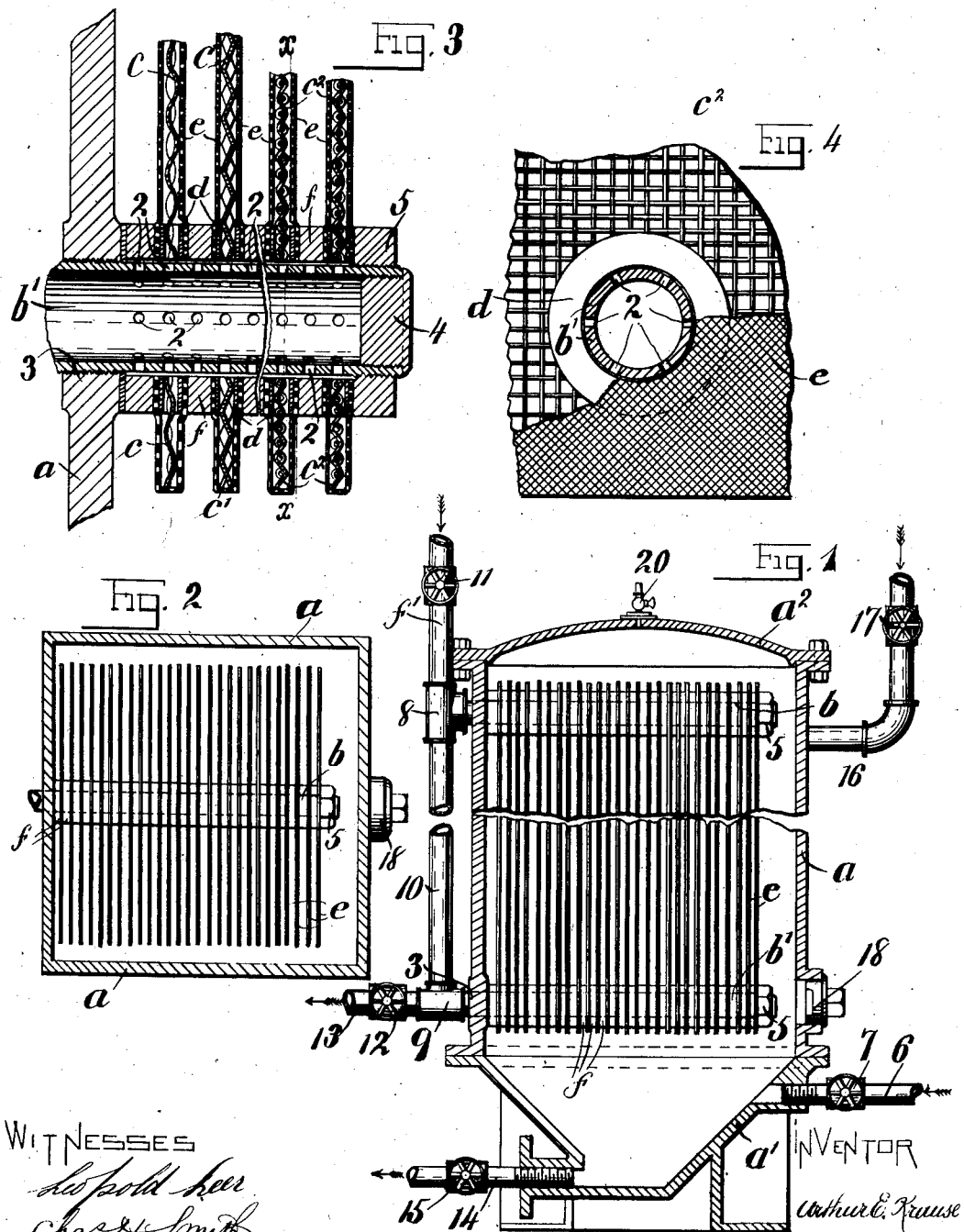

ARTHUR E. KRAUSE, OF JERSEY CITY, NEW JERSEY.

FILTER.

No. 839,772.

Specification of Letters Patent.

Patented Dec. 25, 1906.

Application filed June 14, 1904. Serial No. 212,463.

*To all whom it may concern:*

Be it known that I, ARTHUR E. KRAUSE, a citizen of the United States, residing at Jersey City, in the county of Hudson and State of New Jersey, have invented an Improvement in Filters, of which the following is a specification.

My invention relates to filters; and the object thereof is the provision of a filter for purposes of general filtration which contains a maximum filtering-surface in proportion to its size and which may be readily cleaned and whose construction is comparatively inexpensive.

In carrying out my invention I employ a shell, a receptacle-base, suitable pipe connections thereto for conveying the material to be filtered to the interior of the shell and for discharging the filtrate, for reversing the direction of the fluid passing through the filter for cleansing the parts, for removing the mud and scum collected in the shell, and for admitting air under pressure for accelerating either the filtration or discharge of the accumulation of foreign matter.

Support-arms preferably in the form of perforated pipes are fixed in and extend across within the shell and connect with pipes of the aforesaid connections. Upon these support-arms are disks surfaced with suitable filtering material and with oppositely-placed washers surrounding the support-arms and at right angles thereto, together forming filter units between which on the support-arms are spacing-rings, and I provide means for forcing together the said rings, disks, washers, and filtering material to establish liquid-tight joints.

In the drawings, Figure 1 is a sectional elevation of my improved filter, showing the parts broken away transversely. Fig. 2 is a sectional plan of the same. Fig. 3 is a vertical section through the perforated support-arms, the disks, and the parts associated therewith; and Fig. 4 is a section on the line $x$ $x$, Fig. 3, showing the filtering material in part removed.

I employ a filter-shell preferably comprising a main body portion $a$, having a hollow or receptacle base $a'$ and a cap or cover $a^2$, connected together in any desired manner.

$b$ $b'$ represent support-arms in the form of pipes, with perforations 2, which are secured to one end 3 in the body $a$ of the filter-shell, preferably one directly above the other, the opposite ends of the said pipe-arms being stopped by means of plugs 4.

I employ one or more disks, preferably of metal and provided with irregular surfaces, which, as seen in Fig. 3, may be in the form of wavy corrugations, as indicated at $c$, or as angular corrugations, as indicated at $c'$, or these disks may conveniently be formed of interwoven wires of any desired mesh, as indicated at $c^2$. The disks $c$ $c'$ $c^2$ are provided with openings adapted to receive the perforated pipe-arms $b$ $b'$, and surrounding the said pipe-arms and at either side of every disk I employ washers $d$. The disks and washers may be covered with any suitable filtering material $e$—such, for instance, as twilled cotton. The filtering material is secured together at the edges of the disks and passes exteriorly over the washers $d$. I also employ spacing-rings $f$, which are approximately the same diameter as the washers $d$ and are placed between each of the disks and its covering of filtering material, so that the filtering material covering the said washers comes between the same and the sides of the spacing-rings $f$. I also employ nuts 5, adapted to screw on the inner ends of the perforated pipe-arms to force the washers and the spacing-rings, with the intervening portions of the disks and filtering material, together to make a liquid-tight joint between the washers and rings and intervening portions of the filtering material. It will be readily apparent that with this construction the corrugations of the disks between each pair of washers $d$ provide passages for the filtrate on either side of each of said disks, whereby the material to be filtered by passing through the filtering material readily reaches the interior of the pipe-arms $b$ $b'$, which are preferably slightly smaller than the interior of the washers and spacing-rings. (See Fig. 3.)

6 represents an inlet-pipe having a valve 7 therein preferably leading to the base $a'$ or the lower part of the filter-shell.

8 9 represent T-couplings, to which the outer ends of the pipe-arms are connected.

10 represents a pipe connecting the T-couplings 8 and 9, and $f'$ a pipe extending from the opposite side of the T-coupling 8 and provided with a valve 11.

13 is a pipe connected to the T-coupling 9 and provided with a valve 12, and 14 is a pipe leading from the base of the filter-shell and fitted with a valve 15, and I also employ an air-pipe 16, leading to the upper part of the filter-shell and provided with a valve 17, and I may also find it convenient to provide the filter-shell with one or more hand-holes 18. In the top of the shell I provide an air-cock 20.

In the operation of the apparatus the material to be filtered is conveyed to the interior of the shell by the pipe 6 and fills the same up to the air-cock 20. This valve is then closed, and the liquid then passes through the filtering material and by the way of the channels in the corrugated disks and the spaces between the disks and washers to the interior of the pipe-arms $b\ b'$ and is thence led away by the pipe 13, it being understood that during this operation the valves 11, 15, and 17 are closed.

For cleansing purposes the valves 7, 17, and 12 are closed and the valves 11 and 15 opened in order that steam, water, or other agent for cleansing the filtering material may be passed through the filter in the opposite direction. The air-pipe 16 is provided to carry on the filtering process or cleansing under pressure, as is often found expedient, the air being admitted to the interior of the filter-shell by this pipe.

It is to be understood that in cases where the material to be filtered is of such a composition as not to require a considerable space between the filter units I may dispense with the spacing-rings, and also the same effect as is obtained by using the spacing-rings may be obtained by making the washers of sufficient thickness.

I claim as my invention—

1. A filter, comprising a plurality of disks having holes therein, support-arms passing through the holes in said disks, a filtering material covering and extending around said disks, means for separating said filtering material from the disks at the portions thereof surrounding the said holes, and means for maintaining said disks and their coverings in given spaced-apart positions.

2. A filter, comprising a plurality of disks having holes therein, support-arms passing through the holes in said disks, a filtering material covering and extending around said disks, means for separating said filtering material from said disks at the portions surrounding the holes in the same, means for maintaining said disks and their coverings in given spaced-apart positions, and means for binding the disks and their coverings together at the portions surrounding said support-arms to make a liquid-tight joint around the same.

3. A filter, comprising a plurality of corrugated disks having holes therein, perforated support-arms passing through the holes in said disks, a filtering material covering said disks, washers surrounding said perforated support-arms on either side of each of said disks, and means for maintaining said disks and their coverings in given spaced-apart positions.

4. A filter, comprising a plurality of corrugated disks having holes therein, perforated support-arms passing through the holes in said disks, a filtering material covering and extending around said disks, washers surrounding said perforated support-arms on either side of said disks, and spacing-rings also surrounding the said perforated support-arms to maintain the disks and their coverings in given spaced-apart positions.

5. A filter, comprising a plurality of corrugated disks having holes therein, perforated pipe-arms passing through the holes in said disks, a filtering material covering and extending around said disks, washers surrounding said perforated pipe-arms on either side of said disks, spacing-rings also surrounding the said perforated pipe-arms to maintain the disks and their coverings in given spaced-apart positions, and nuts adapted to screw on the inner ends of said pipe-arms to bind the said spacing-rings and washers with the intervening portions of the said disks and filtering material together.

6. In a filter, the combination with a shell and pipe-arms secured therein, of a plurality of disks having holes therein adapted to receive said pipe-arms, a filtering material covering and extending around said disks, means for separating said filtering material from said disks at the portions adjacent to the holes therein, and means for maintaining said disks and their coverings in given spaced-apart positions.

7. In a filter, the combination with a shell and pipe-arms secured therein, of a plurality of disks having holes therein adapted to receive said pipe-arms, a filtering material covering and extending around said disks, means for separating said filtering material from said disks at the portions adjacent to the holes therein, means for maintaining said disks and their coverings in given spaced-apart positions, and means for binding the said disks and their coverings together at the portions surrounding said pipe-arms to make liquid-tight joints around the same.

8. In a filter, the combination with a shell and perforated pipe-arms secured therein, of a plurality of corrugated disks having holes therein adapted to receive the said perforated pipe-arms, washers surrounding said pipe-arms on both sides of each of said disks, a filtering material covering said disks and extending over the said washers, and means for maintaining the said disks and their coverings in given spaced-apart positions.

9. A filter comprising a disk having irregular surfaces, an arm passing through said disk for supporting the same, a filtering material covering the surfaces of said disk, and washers surrounding the aforesaid arm adjacent to both sides of said disk and over which the said filtering material extends.

10. A filter, comprising a disk having a hole therein, a support-arm passing through the hole in said disk, a filtering material covering the surfaces of said disk, washers surrounding the aforesaid arm adjacent to both sides of said disk and over which the said filtering material extends, and means for permitting the filtrate to pass between said disk and washers.

11. A filter, comprising a plurality of disks having holes therein, support-arms passing through the holes in said disks, a filtering material covering said disks, and means for separating said filtering material from the disks at the portions thereof surrounding the said holes.

12. A filter comprising a disk with irregular surfaces having an opening, a filtering material covering the disk and having alining openings, washers at opposite sides of the disk touching the same, placed in line with the openings and over which the filtering material extends, an arm passing through the washers and disk-opening for supporting the same, and coacting means forming such a liquid-tight joint as will oblige the filtrate to pass through the filtering material.

13. A filter, comprising a disk having irregular surfaces and a filtering material covering the disk and having alining openings, washers at opposite sides of the disks, touching the same, placed in line with the openings and over which the filtering material extends, arms passing through the washers and disk-openings for supporting the same, and coacting means forming such a liquid-tight joint as will oblige the filtrate to pass through the filtering material and through the spaces formed between the washers and irregular disk-surfaces.

14. In a filter, the combination with a shell and perforated pipe-arms secured therein, of a plurality of corrugated disks having holes therein adapted to receive the said perforated pipe-arms, washers surrounding said pipe-arms on both sides of each of said disks, a filtering material covering said disks and extending over the said washers, and spacing-rings also surrounding the said pipe-arms to maintain the said disks and their coverings in given spaced-apart positions.

15. In a filter, the combination with a shell and perforated pipe-arms secured therein, of a plurality of corrugated disks having holes therein adapted to receive the said perforated pipe-arms, washers surrounding said pipe-arms on both sides of each of said disks, a filtering material covering said disks and extending over the said washers, spacing-rings also surrounding the said pipe-arms to maintain the said disks and their coverings in given spaced-apart positions, and nuts adapted to screw on the ends of said pipe-arms to bind the said washers and spacing-rings and the intervening portions of the disks and filtering material together to form a liquid-tight joint between the said washers and rings and intervening portions of the filtering material.

16. In a filter, the combination with a shell and perforated pipe-arms secured therein, of a plurality of disks having holes therein adapted to receive said pipe-arms, a filtering material covering said disks, means for separating said filtering material from said disks at the portions adjacent to the holes therein, means for maintaining said disks and their coverings in given spaced-apart positions, and connections for conveying the liquid to be filtered to the interior of the shell and for carrying the filtrate away.

17. In a filter, the combination with a shell and perforated pipe-arms secured therein, of a plurality of corrugated disks having holes therein adapted to receive the said perforated pipe-arms, washers surrounding said pipe-arms on both sides of each of said disks, a filtering material covering said disks and extending over the said washers, spacing-rings also surrounding the said pipe-arms to maintain the said disks and their coverings in given spaced-apart positions, nuts adapted to screw on the ends of the said pipe-arms to bind the said washers and spacing-rings and the intervening portions of the disks and filtering material together to form liquid-tight joints between the washers and rings and intervening portions of filtering material, and connections for conveying the liquid to be filtered to the interior of the shell and for carrying the filtrate away.

18. A filter, comprising a disk having irregular surfaces, a perforated tubular device for supporting the same, a filtering material covering said disk, washers surrounding the aforesaid tubular device adjacent to both sides of said disk and over which the said filtering material extends, and means for permitting the filtrate to pass between said disks and washers.

19. In a filter, the combination with a series of filter-bags and interior stiffening-linings therefor, both of which are provided with openings near opposite edges, of pipe members passing through said openings and serving as ways for liquid in the filtering operations and connected to and serving as the means of support of said filter-bags.

20. In a filter, the combination with a series of filter-bags and interior stiffening-linings therefor, both of which are provided with openings near opposite edges, of pipe members passing through said openings and serving as ways for liquid in the filtering operations, washers for separating the bags of the series and means for securing the bags to the pipe members which become the sole support of the filter-bags.

21. In a filter, the combination with a series of filter-bags and interior stiffening-linings therefor, both of which are provided with openings near opposite edges, of perforated pipe members passing through said openings and serving as ways for liquid in the filtering operations, washers for separating the bags of the series and other washers between the bags and their linings and nuts on one end of each pipe member for securing the bags to the pipe members which become the sole support of the filter-bags.

Signed by me this 25th day of May, 1904.

ARTHUR E. KRAUSE.

Witnesses:
  A. H. SERRELL,
  GEO. P. PINCKNEY.